Patented Jan. 8, 1929.

1,698,009

UNITED STATES PATENT OFFICE.

FRIEDRICH W. WEBER, OF HACKENSACK, NEW JERSEY.

CATALYST.

No Drawing. Application filed December 1, 1924, Serial No. 753,374. Renewed May 22, 1928.

This invention relates to an active or contact substance and it particularly relates to an active or contact substance consisting of a silica-thoria-asbestos, the object of the invention being to provide, at a low price, an efficient and stable contact substance capable of exerting, among other functions, that of a catalyst for various chemical operations which will be benefited by catalytic influence.

In accordance herewith other objects will become apparent and will be more particularly pointed out and described in the following specification.

Catalysis is a matter of surface and the catalytic power, of effect, of the various agents, as for instance of the rare metals, various oxides, etc., is very variable according to the method applied for their preparation; the precipitation of the hydroxides and their transformation into the corresponding oxides at various temperatures governs greatly their activity as catalysts.

It is known that a tissue of vegetable fibres, impregnated with thorium nitrate, upon ignition furnishes a coherent skeleton in the form of a fine, voluminous mass. It finds its application in this form in the incandescent gas light, invented by Auer von Welsbach, which is characterized by an unusually great emanation of light.

It is also known from the manufacture of thorium compounds from monazite sand that some compounds of the rare earth metals, as for instance the chlorides, such as thorium chloride, are precipitated from their solutions in the form of their superoxide hydrate, if said solutions are acted upon, at an elevated temperature, with hydrogen peroxide; that thoriumsuperoxide-hydrate is of great stability even in boiling solutions and can only be changed into thorium di-oxide by strongly glowing it, whereby it loses its solubility in acids except in sulfuric acid.

I have now found that I can obtain products allowing a broad field of application if I embody the compounds of the rare earth metals, preferably thorium, either alone, or in combination with other acid oxides, as for instance silica, into a mineral carrier, preferably silicious material such as asbestos, amphibolite, or other natural mineral or artificial product of similar chemical and physical properties.

Selecting for the illustration of my invention, by way of example, the production of a silica-thoria-asbestos, I shall describe in the following how I proceed to prepare the same:

I first extract the not too finely divided mineral, for instance amphibolite, with hydrochloric acid for the purpose of removing the iron oxide more or less mechanically adhering to the amphibolite, pour off the acid liquor, whereupon the reaction mass, still retaining a considerable amount of acid, is saturated with a quantity of sodium silicate solution proportionate to the quantity of HCl left in the reaction mass. It is important that the sodium silicate solution penetrate the whole mass of the acid amphibolite thoroughly and this may be done advantageously by creating a vacuum in the reaction vessel whereby the sodium silicate solution is caused to penetrate the fine pores of capillary spaces all through. By the action of the hydrochloric acid upon the sodium silicate in the capillary spaces, a precipitate of silica-hydrate is created within said spaces. The mass is then brought to incandescence and after it has cooled down again, the sodium chloride, generated by the decomposition of the sodium silicate, is washed out with water. The mass is preferably dried again and after it is completely saturated with thorium nitrate, it is brought to incandescence so as to transform the thorium nitrate into thorium oxide.

Example.

1 kilo of not too finely divided amphibolite is treated with 1000 cc. of conc. HCl for about two hours on the water-bath and then the greater part of the acid solution is sucked off under slight vacuum, whereupon the moist amphibolite is covered with as much of a preferably 10–20% solution of sodium silicate until alkaline reaction is obtained. From the reaction mixture the surplus of sodium silicate is sucked off with a slight vacuum whereupon the mass is dried and brought to incandescence. Subsequently upon cooling the sodium chloride is washed out and the mass is then in turn just covered with a 10% solution of thorium nitrate and any surplus is removed by filtering as was done with the surplus of the sodium silicate solution. Finally the reaction mass is then brought once more to incandescence to decompose the thorium nitrate. Ultimately a deposit of silica and thoria is thus obtained in the intercellular or capillary spaces of the amphibolite; according to requirements the quantities of the chemicals referred to in above example may be varied as the situation may change.

Also the precipitation of the rare earth metal compounds by the hydrogen peroxide in the form of their superoxide hydrate may be resorted to to produce for instance thoriumsuperoxide within the capillary spaces of the amphibolite, the modification of the above formula being obvious to the skilled chemist.

The silica thoria asbestos obtained by the above methods can be formed into various shapes during the course of its production, preferably before the decomposition of the thorium-nitrate into thoriumoxide; the shape is of course exclusively governed by the purpose for which the silica-thoria-asbestos thus produced is intended.

For the better understanding of my invention and to get a view on the scope of the same, I am going to describe some of the utilizations of the silica-thoria-asbestos in the chemical and allied industries:

As a heat reflecting illuminating material, when in contact with the flame of gases producing considerable heat, such as methane, illuminating gas, hydrogen etc., it offers the possibility of advantageously utilizing for instance the high temperature of 2000 centigrade generated by the combustion of even small quantities of hydrogen by bringing the faintly luminous flame of hydrogen into contact with a silica-thoria-asbestos wall thereby raising the thoria therein to incandescence; it is a further advantage that I simultaneously may act with oxygen upon the opposite side of the wall so that the enormous incandescence of the thorium-oxide, obtained already by the high heat of the hydrogen, is still increased and that furthermore a great amount of heat is created and rendered noticeable by radiation from said silica-thoria-asbestos wall.

Furthermore I have found that I can utilize the silica-thoria-asbestos in the synthetic organic work, whenever a mild and easily regulatable oxidation is intended, by inserting the voluminous mass of the silica-thoria-asbestos into a receiver and passing the gases to be acted upon, through the same at a certain temperature, or liquids may be put into the receiver together with the silica-thoria-asbestos catalyst and the mixture being vigorously agitated, oxygen or air is passed through the well agitated mass. If solids are to be acted upon they are mixed with the silica-thoria-asbestos and oxygen or air is then passed through the mass.

It is a well known fact that catalysts like platinum, chromium, iron, nickel, either in their metallic state or in the form of the oxide, have certain disadvantages, especially platinum, which is very expensive and yet is easily reduced in its effectiveness by very small quantities of impurities, such as arsen, iron, selenium, etc., occurring in the materials which are to be combined or acted upon by the action of platinum.

My new silica-thoria-asbestos, however, is stable because it is incombustible and practically non-volatile; it is also resistant to impurities, especially against acids except sulfuric acid. It stands to reason that this remarkable resistance is of importance for the chemical industries and as there is an abundance of monazite sand to yield thoriumoxide at a low cost, the silica-thoria asbestos is destined to find application in many processes in preference to the platinum or palladium asbestos.

The chemical effect of my new silica-thoria-asbestos may probably be explained by the assumption that $ThO_2$ has a high absorption power for oxygen and that its extremely finely divided particles, when in contact with easily oxidizable substances, give off their oxygen to be immediately again reoxidized or regenerated, by the oxygen of the air without sustaining any loss in weight by decomposition or volatilization. Moreover, there is no impairment, or inactivation, of the catalyst by the applied substance or impurities in the same, nor can the reaction materials be soiled by the catalyst itself.

An example for such an oxidation of organic substances by the oxygen of the air by the interaction of my new silica-thoria-asbestos is the oxidation of the various substances yielding vanillin, the materials being either treated with oxygen of the air in the form of their solution, the silica thoria asbestos being suspended therein, or if these starting materials are solids and are to be treated in this form, the silica-thoria asbestos is mixed to the solids and air passed over and through the mixture, the generated vanillin being separated in any of the well known ways.

On account of its stability my new silica-thoria asbestos substitutes the mineral hæmatite, which is applied in various cracking processes, because the natural hæmatite occurs in several variations and does not, on account of the gangue material occurring with it, offer the same uniform constant proportion of Fe and O which is desirable for the operation of these kinds of processes.

I have furthermore found that my silica thoria asbestos may be advantageously used for the removal or transformation of unsaturated hydrocarbons, as for instance mesitylene, and of mercaptans, from the distillates of crude oils as well as from so-called cracking products; both these kinds of oils are often of yellow color and of unpleasant smell. This purification is effected by distilling such oils over the silica-thoria asbestos, or by passing their vapors through heated iron pipes containing the same, a clear and colorless liquid being obtained by either way of operating this particular process. In operating this process either way I first prefer to remove the dirt suspended in the oils by filtration and then I act upon them with fuller's earth or other well known clearing agent to remove as much as possible any impurities which may be precipitated therefrom by these agents so as to prevent the silica-thoria asbestos from being unnecessarily burdened with materials which can be removed in any simple and inexpensive way, for the last traces of impurities, which are so strongly noticeable and render the use of the oil almost an impossibility, are then easily and thoroughly removed by heating the oils in the presence of my new silica thoria asbestos, or by filtering the oils through the same.

The filtration of slimy, jelly-like substances is known to be connected with great difficulties which mostly arise by the clogging of the pores of the filtering material, and occasionally by its destruction owing to the high alkalinity or acidity of the liquors to be filtered. There are, indeed, cases where it appears absolutely necessary that such liquors during their filtration must only be brought into contact with an inert inorganic material unless they undergo decomposition; for instance glass wool is too expensive and is not satisfactory, for instance, for filtering silver nitrate, or potassium permanganate.

In all such cases I operate successfully by applying my new silica-thoria asbestos which proves an excellent filtering material inasmuch as it appears to absorb the particular ingredient rendering the solution slimy, and it simultaneously absorbs any smell as well as discoloring matter in said solution most effectively.

I am aware that according to the investigations of Auer v. Welsbach preferably a mixture of 99% $ThO_2$ and 1% $CeO_2$ is suitable for the impregnation of gas mantles because the light radiated by gas mantles impregnated with this particular mixture appears almost perfectly white, whereas the light of mantles impregnated with $ThO_2$ only, is considerably less white; it is also known by these investigations that the presence of other rare earth metals gives the light rather pale undesirable shades, especially in the presence of iron and silica in the impregnated mantles. These impurities also render the gas mantle more fragile. These disadvantages, caused by the impurities referred to above, are keenly felt in the incandescent gas light industry, but they are of no concern as the presence of small traces of cerium, neodymium, praseodymium, yttrium, ytterbium, tend to increase the radiation of light, but its more or less white color is of secondary importance as the incandescent body is primarily used as a means for the radiation of heat and the distribution of same, as for instance as a source of heat in a fire place, where different colors are even often desired.

In the precipitation of thoriumsuperoxide-hydrate from a weakly acid solution of a mixture of rare earth metals, a certain amount of yellow $Ce_2O$ is always occluded in the precipitate and the only way to produce the pure thorium compound would be to repeat this precipitation several times until the Ce is entirely removed. This, however, as well as any other method of purification, would render the preparation of the pure thoriumsuperoxide-hydrate too costly and as on the other side, for the reason explained above, the presence of traces of Ce or other rare earth metals does not disturb, a too far going purification is not carried out.

The preceding description affords ample proof that asbestos, or a substance of similar chemical and physical properties, displays a high efficiency as catalyst if an oxide of acid reaction and an oxide of a rare earth metal are deposited in its capillary spaces. This high effectiveness of my new active substances thus obtained is probably due to the infinitely finely divided nature of the deposits of the various oxides in the pores or capillary spaces of the asbestos.

What I claim is:

1. The process of producing a catalyst in the form of a porous body, consisting in acting upon asbestos with an acid, impregnating the acidulated asbestos with a soluble silicate forming silicon hydrate and a soluble salt with said acid, heating the mixture to incandescence, washing the generated salt out of the silicious material, impregnating said silicious material with a solution of a rare earth metal compound and transforming the same into an oxide of said rare earth metal.

2. The method of producing a catalyst in the form of a porous body, consisting in acting upon asbestos with an acid, impregnating the acidulated asbestos with a soluble silicate forming silicon hydrate and a soluble salt with said acid, heating the mixture to incandescence, washing the generated salt out of the silicious material, impregnating the said silicious material with a solution of thorium nitrate and transferring the same into thorium oxide.

3. A catalyst in the form of a porous body capable of causing a chemical reaction between other chemical substances, the catalyst comprising asbestos, a precipitate of an acid oxide and of an oxide of a rare earth metal in the capillary spaces of said asbestos.

4. A catalyst in the form of a porous body capable of causing a chemical reaction between other chemical substances, the catalyst comprising asbestos, a precipitate of silicon dioxide and of an oxide of a rare earth metal in the capillary spaces of said asbestos.

5. A catalyst in the form of a porous body capable of causing a chemical reaction between other chemical substances, the catalyst comprising asbestos, a precipitate of silicon dioxide and of thorium oxide in the capillary spaces of said asbestos.

Signed at New York in the county of New York and State of New York this 28th day of November, A. D. 1924.

FRIEDRICH W. WEBER.